(12) United States Patent
Hwang et al.

(10) Patent No.: US 11,078,881 B1
(45) Date of Patent: Aug. 3, 2021

(54) METHOD FOR DETECTING KNOCKING OF ENGINE FOR VEHICLE

(71) Applicants: Hyundai Motor Company, Seoul (KR); Kia Motors Corporation, Seoul (KR)

(72) Inventors: Kook Jin Hwang, Suwon-si (KR); Ju Hyeong Seo, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/070,551

(22) Filed: Oct. 14, 2020

(30) Foreign Application Priority Data

May 6, 2020 (KR) .......................... 10-2020-0053817

(51) Int. Cl.
| | | |
|---|---|---|
| *F02P 5/152* | (2006.01) | |
| *G01M 15/05* | (2006.01) | |
| *F02D 41/00* | (2006.01) | |
| *F02D 41/30* | (2006.01) | |

(52) U.S. Cl.
CPC ............ *F02P 5/152* (2013.01); *F02D 41/009* (2013.01); *F02D 41/30* (2013.01); *G01M 15/05* (2013.01)

(58) Field of Classification Search
CPC ........ F02P 5/152; F02D 41/009; F02D 41/30; G01M 15/05
See application file for complete search history.

(56) References Cited

U.S. PATENT DOCUMENTS

| | | | | |
|---|---|---|---|---|
| 4,450,810 | A | 5/1984 | Wada et al. | |
| 9,835,514 | B2 * | 12/2017 | Sasaki | F02D 35/027 |
| 10,746,153 | B2 * | 8/2020 | Hakeem | F02P 5/1521 |
| 10,871,113 | B2 * | 12/2020 | Forti | F02D 35/027 |
| 2004/0260453 | A1 * | 12/2004 | Sauler | G01L 23/225 |
| | | | | 701/111 |
| 2011/0153182 | A1 * | 6/2011 | Sasaki | F02D 35/027 |
| | | | | 701/111 |
| 2012/0192835 | A1 * | 8/2012 | Matsushima | F02P 5/152 |
| | | | | 123/436 |
| 2019/0353133 | A1 * | 11/2019 | Hakeem | F02P 5/1521 |
| 2019/0360420 | A1 * | 11/2019 | Hakeem | F02P 5/152 |
| 2020/0003136 | A1 * | 1/2020 | Forti | F02D 35/027 |
| 2020/0072139 | A1 * | 3/2020 | Kiwan | F02D 35/027 |

* cited by examiner

*Primary Examiner* — Carl C Staubach
(74) *Attorney, Agent, or Firm* — Morgan, Lewis & Bockius LLP (57) ABSTRACT

A method for detecting knocking of an engine includes receiving a knock signal indicating a vibration level in a cylinder of the engine and a crank angle signal indicating a crank angle by which a knocking window and an end of injection (EOI) of an injector of the engine are expressed, determining whether the knocking window and the EOI overlap, based on the crank angle signal, setting a second reference value for an overlapping range within the knocking window overlapping the EOI by reflecting a predetermined level on a first reference value for a non-overlapping range within the knocking window non-overlapping the EOI depending on the determination, integrating the knock signal in the knocking window, determining whether an integrated value of the knock signal exceeds the first reference value in the non-overlapping range or the second reference value in the overlapping range, and retarding an ignition timing of the engine as a knocking avoidance logic depending on the determination.

14 Claims, 5 Drawing Sheets

METHOD FOR DETECTING KNOCKING OF ENGINE FOR VEHICLE

CROSS-REFERENCE TO RELATED APPLICATION

The present application claims priority to Korean Patent Application No. 10-2020-0053817 filed on May 6, 2020, the entire contents of which is incorporated herein for all purposes by this reference.

BACKGROUND OF THE INVENTION

Field of the Invention

The present invention relates to a method for detecting knocking of an engine.

Description of Related Art

An electronic control unit (ECU) for an engine of a vehicle determines whether knocking occurs by comparing a vibration signal detected by a knock sensor with a reference value. When the knocking occurs, the ECU may typically perform a knocking control where ignition timing is retarded and then gradually recovered to original ignition timing.

By analyzing the signal of the knock sensor, the ECU may periodically determine the occurrence of knocking for each of a plurality of cylinders. However, various noises are generated around the cylinder due to valve opening and closing, crankshaft rotation, etc., and these noises are also detected by the knock sensor, which may cause false detection of knocking. In consideration of such a case, the ECU may integrate the vibration signal detected by the knock sensor for a range with a high frequency of knocking occurrence, and may compare the integrated value with a reference value reflecting various noises, to determine whether knocking occurs. At the instant time, the range with a high frequency of knocking occurrence, i.e., a knocking control range, is called a knocking window.

Meanwhile, the noise component reflected in the reference value includes noise expected to occur in a peripheral device of the cylinder, but does not include noise generated in the neighboring cylinder.

In the case that the engine utilizes a fuel injection scheme and includes a plurality of cylinders, when an end of injection (EOI) (i.e., a time point where fuel injection is finished) of an injector of the engine of a specific cylinder overlaps a knocking window of a neighboring cylinder, noise due to closing of an injector of the engine of the specific cylinder may be detected by the knock sensor as a knocking signal with respect to the neighboring cylinder. Accordingly, the ECU may incorrectly determine that knocking has occurred in the neighboring cylinder, and may excessively retard the ignition timing. Excessive retardation of the ignition timing may cause several defects, such as loss of fuel economy and deterioration of vehicle drivability.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a method for detecting knocking of an engine for a vehicle having advantages of reducing false detection of knocking.

An exemplary method for detecting knocking of an engine for a vehicle by an electronic control unit includes receiving a knock signal indicating a vibration level in a cylinder of the engine and a crank angle signal indicating a crank angle by which a knocking window and an end of injection of an injector in the engine are expressed, determining whether the knocking window and the end of injection of the injector overlap or not, based on the crank angle signal, setting a second reference value for an overlapping range within the knocking window overlapping the end of injection of the injector by reflecting a predetermined level on a first reference value for a non-overlapping range within the knocking window non-overlapping the end of injection of the injector, depending on whether the knocking window and the end of injection of the injector overlap or not, integrating the knock signal in the knocking window, determining whether an integrated value of the knock signal exceeds the first reference value in the non-overlapping range or the second reference value in the overlapping range, and retarding an ignition timing of the engine as a knocking avoidance logic depending on whether the integrated value of the knock signal exceeds the first reference value in the non-overlapping range or the second reference value in the overlapping range.

The electronic control unit may receive the crank angle signal from a crank angle sensor configured for detecting a rotation angle of a crankshaft in the engine, and the knock signal from a knock sensor configured for detecting vibration in the cylinder.

Another method for detecting knocking of an engine for a vehicle by an electronic control unit, the method includes receiving a knock signal indicating a vibration level in a cylinder of the engine and a crank angle signal indicating a crank angle by which a knocking window and an end of injection of an injector in the engine are expressed, determining whether the knocking window and the end of injection of the injector overlap or not, based on the crank angle signal, subtracting a value corresponding to the vibration level generated when the injector closes in an overlapping range within the knocking window overlapping with the end of injection of the injector from the knock signal, depending on whether the knocking window and the end of injection of the injector overlap or not, integrating the knock signal in a non-overlapping range within the knocking window non-overlapping the end of injection of the injector and integrate the subtracted knock signal in the overlapping range, determining whether the knock signal or the subtracted integrated value of the knock signal exceeds a first reference value, and retarding an ignition timing of the engine as a knocking avoidance logic depending on whether the knock signal or the subtracted integrated value of the knock signal exceeds a first reference value.

The electronic control unit may receive the crank angle signal from a crank angle sensor configured for detecting a rotation angle of a crankshaft in the engine, and the knock signal from a knock sensor configured for detecting vibration in the cylinder.

According to various exemplary embodiments of the present invention, a false detection of knocking may be prevented.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various exemplary embodiments included in the exemplary embodiment will be described in detail with reference to the accompanying drawings. In the exemplary embodiment, the same or similar components will be denoted by the same or similar reference numerals, and a repeated description thereof will be omitted. Terms "module" and/or "unit" for components used in the following description are used only to easily describe the specification. Therefore, these terms do not have meanings or roles that distinguish them from each other in and of themselves. In describing exemplary embodiments of the exemplary embodiment, when it is determined that a detailed description of the well-known art associated with the present invention may obscure the gist of the present invention, it will be omitted. The accompanying drawings are provided only to allow exemplary embodiments included in the exemplary embodiment to be easily understood and are not to be interpreted as limiting the spirit included in the exemplary embodiment, and it is to be understood that the present invention includes all modifications, equivalents, and substitutions without departing from the scope and spirit of the present invention.

Terms including ordinal numbers such as first, second, and the like will be used only to describe various components, and are not to be interpreted as limiting these components. The terms are only used to differentiate one component from other components.

It is to be understood that when one component is referred to as being "connected" or "coupled" to another component, it may be connected or coupled directly to the other component or may be connected or coupled to the other component with a further component intervening therebetween. Furthermore, it is to be understood that when one component is referred to as being "directly connected" or "directly coupled" to another component, it may be connected or coupled directly to the other component without a further component intervening therebetween.

It will be further understood that terms "comprises" and "have" used in the exemplary embodiment specify the presence of stated features, numerals, steps, operations, components, parts, or combinations thereof, but do not preclude the presence or addition of one or more other features, numerals, steps, operations, components, parts, or combinations thereof.

Figure 1:
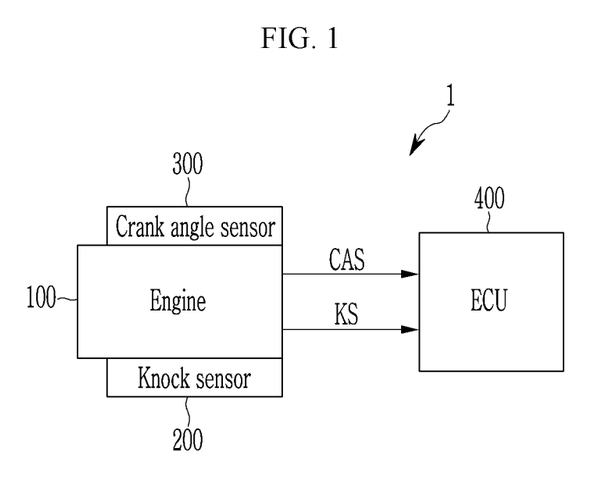
FIG. 1 illustrates a system for detecting knocking of an engine for a vehicle according to various exemplary embodiments of the present invention.
Figure 2:
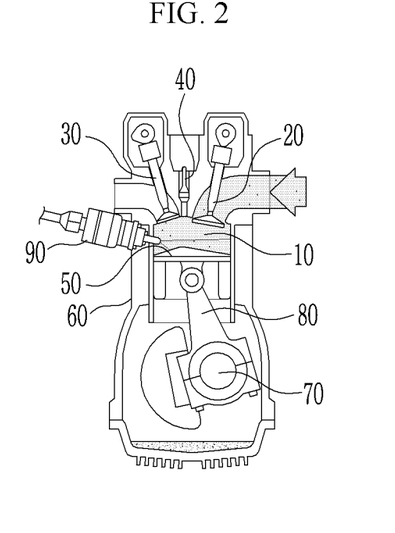
FIG. 2 illustrates an exemplary structure of an engine shown in FIG. 1.

FIG. 1 illustrates a system for detecting knocking of an engine for a vehicle according to various exemplary embodiments of the present invention, and FIG. 2 illustrates an exemplary structure of an engine shown in FIG. 1.

Referring to FIG. 1, a knocking detection system 1 of an engine for a vehicle includes an engine 100, a knock sensor 200, a crank angle sensor 300, and an electronic control unit (ECU) 400.

Referring to FIG. 2, the engine 100 includes a combustion chamber 10, an intake valve 20, an exhaust valve 30, a spark plug 40, a piston 50, a cylinder 60, a crankshaft 70, and a connecting rod 80.

The engine 100 may be a gasoline direct injection (GDI) engine, where an injector 90 positioned at a top portion of the cylinder 60 directly injects fuel into the cylinder 60. The injector 90 injects fuel (gasoline, etc.) in a form of a fine mist to be mixed well with air. According to various exemplary embodiments of the present invention, the engine 100 includes a plurality of cylinders 60, and each cylinder 60 may be provided with the injector 90.

The engine 100 drives the vehicle with energy obtained by combusting the fuel. For example, the engine 100 operates in a manner in which one cycle is completed by performing four strokes (e.g., in a four-stroke engine) of an intake stroke, a compression stroke, an expansion (power) stroke, and an exhaust stroke. At the instant time, a stroke is a full upward or downward movement of the piston in the cylinder.

In the intake stroke, the piston 50 moves downwardly from a top dead center (TDC) to a bottom dead center (BDC) while the intake valve 20 is open and the exhaust valve 30 is closed, taking an air into the combustion chamber 10. At the instant time, the fuel (e.g., gasoline) injected by the injector 90 is mixed with the air in the combustion chamber 10 to form an air-fuel mixture (i.e., mixture of air and fuel). That is, the air-fuel mixture is filled in the cylinder 60 while the crankshaft 70 rotates 180°. The intake stroke ends when the intake valve 20 is closed. For example, in the intake stroke where the crankshaft 70 rotates from −360° to −180°, an internal pressure of the cylinder is the same or similar to an atmospheric pressure.

In the compression stroke, the piston 50 compresses the air-fuel mixture by moving upwards from the bottom dead center (BDC) to the top dead center (TDC) while the intake valve 20 and the exhaust valve 30 are closed. For example, the crankshaft 70 completes one turn (i.e., 360° rotation from −360° to 0°) by the intake stroke and the compression stroke.

According to various exemplary embodiments of the present invention, noise may occur as the injector 90 in the adjacent cylinder 60 closes before the piston 50 reaches the top dead center (TDC) in the compression stroke. For example, in the case of multiple injections (split injections) or when a fuel having longer injection period compared with gasoline (such as ethanol having lower theoretical air-fuel ratio) is used, an end of injection (EOI) of the injector 90 finishing a fuel injection may be later than in normal cases. In the instant case, the end of injection (EOI) of the injector 90 may overlap a knocking window of a neighboring cylinder 60, and therefore, the vibration (hereinafter called injector closing vibration) due to closing of the injector 90 may be detected by the knock sensor 200 as being related to knocking of the neighboring cylinder 60.

Knocking is an abnormal combustion that occurs within the cylinder 60, making a hammering sound. The knocking window is a crank angle range with a high frequency of knocking occurrences and may be determined by experiment. For example, the knocking window may be set to be a predetermined range within 0° to 90° of the crankshaft 70 in the expansion stroke B.

For the expansion stroke, the spark plug 40 causes a spark discharge to ignite the air-fuel mixture. For example, when the spark plug 40 ignites the air-fuel mixture at a few degrees before top dead center (BTDC), gentle combustion is initiated and thereby temperature and pressure of gas around an ignited portion are increased. Subsequently, explosive combustion occurs and thereby a maximum pressure is formed after slightly after the top dead center (TDC). It may be understood that a high temperature and pressure rise occurs within the cylinder 60 during a combustion period. The combustion gas at high temperature and high pressure pushes down the piston 50, and the thermal energy of the combustion gas is converted into rotational kinetic energy which is delivered to a flywheel through the crankshaft. At an end portion of the expansion stroke, the piston 50 is in the bottom dead center (BDC).

In the exhaust stroke, the exhaust valve 30 is open, and when the piston 50 moves upwards to the top dead center (TDC), the piston 50 pushes upwards the combustion gas to be exhausted out of the combustion chamber 10. For example, when the exhaust stroke is finished, the crankshaft 70 completes two turns (i.e., 720° rotation of from −360° to 360°).

The knock sensor 200 detects vibration in the cylinder 60 and transmits a knock signal KS indicating the vibration level to the ECU 400. For example, the knock sensor 200 may generate a voltage corresponding to the vibration level in the cylinder 60, and transmit a knock signal KS corresponding to the voltage to the ECU 400.

In short, the knock sensor 200 is a sensor that detects knock or knocking, which is an abnormal combustion occurring in the engine 100. The knock sensor 200 may include a vibration sensor that captures vibration according to a pressure change in the cylinder 60 when knocking occurs.

The crank angle sensor 300 detects a rotation angle of the crankshaft 70 and transmits a crank angle signal CAS indicating the rotation angle of the crankshaft 70 to the ECU 400. Referring to FIG. 2, as the crankshaft 70 rotates, the connecting rod 80 connected to the crankshaft 70 pushes and pulls the piston 50 upwards and downwards. For example, during one cycle, the crankshaft 70 rotates two turns (720° rotation), and the piston 50 repeats twice a reciprocal upward and downward movement of moving from the top dead center (TDC) to the bottom dead center (BDC) and then back to the top dead center (TDC). Therefore, the rotation angle of the crankshaft 70 includes information related to a real time position of the piston 50, the knocking window, and the end of injection (EOI) of the injector 90.

The ECU 400 determines whether knocking occurs by analyzing the knock signal KS and the crank angle signal CAS. In a normal combustion, the combustion is initiated by the ignition of the spark plug 40 just before the piston 50 reaches the top dead center (TDC) near an end portion of the compression stroke, and thereby an explosive combustion is generated in an early period in the expansion stroke B. When knocking occurs, for example, the ECU 400 performs knocking avoidance logic, in which the ECU 400 retards the ignition timing and then gradually recovers the ignition timing.

The knock signal KS includes information indicating the vibration level in the cylinder 60. According to various exemplary embodiments of the present invention, vibration in the cylinder 60 may include normal vibration, knocking vibration, and injector closing vibration.

Normal vibration is vibration that occurs periodically or frequently by devices around the cylinder 60, such as opening and closing of the intake valve 20 and/or the exhaust valve 30. According to various exemplary embodiments of the present invention, the normal vibration is considered when determining a first reference value for determining whether knocking occurs.

The knocking vibration is accompanied when knocking occurs. When knocking occurs, the pressure in the cylinder 60 oscillates by the knocking, and the cylinder 60 vibrates. For example, a frequency of the knocking vibration may be distinguished from a frequency detected by the normal vibration, and may belong to a range of 6 to 20 KHz.

The injector closing vibration occurs when the injector 90 closes at finishing the fuel injection. The end of injection (EOI) of the injector 90 may be set so as not to overlap with the knocking window of the cylinder 60. Therefore, the injector closing vibration may not be considered when setting the first reference value for determining whether the knocking occurs. Meanwhile, the end of injection (EOI) of the injector 90 may overlap with the knocking window of the neighboring cylinder 60. In the instant case, the injector closing vibration may be detected by the knock sensor 200 as being related to knocking of the neighboring cylinder 60, and accordingly, the ECU 400 may falsely determine that knocking occurs at the neighboring cylinder 60.

The crank angle signal CAS includes information indicating the rotation angle of the crankshaft 70. For example, the rotation angle of the crankshaft 70 includes information related to a real time position of the piston 50, and the knocking window and the end of injection (EOI) of the injector 90 are indicated or expressed by the crank angle.

The ECU 400 may prevent a false detection of knocking by comparing a knocking vibration level with the first reference value considering the normal vibration included in the knock signal KS and a second reference value considering the normal vibration and the injector closing vibration.

The ECU 400 may determine whether the knocking window and the end of injection of injector 90 overlap based on the crank angle signal CAS, and may determine whether knocking occurs in at least one range of an overlapping range and a non-overlapping range within the knocking window with respect to an end of injection of an injector.

According to various exemplary embodiments of the present invention, the ECU 400 may determine whether knocking occurs by comparing an integrated value of the knock signal KS in the non-overlapping range with the first reference value, and by comparing the integrated value of the knock signal KS in the overlapping range with the second reference value. The ECU 400 may determine that knocking has occurred when the integrated value of the knock signal KS exceeds at least one of the first reference value and the second reference value. At the instant time, the ECU 400 may set the second reference value for the overlapping range by reflecting a value corresponding to the vibration level generated when the injector 90 closes on the first reference value. The second reference value may be set by adding the vibration level generated when the injector 90 closes to the first reference value.

According to another exemplary embodiment of the present invention, the ECU 400 may subtract, from the knock signal, a value corresponding to the vibration level generated when the injector 90 closes in the overlapping range. The ECU 400 may determine whether knocking occurs by comparing the first reference value with an integrated value of the knock signal subtracted with a value corresponding to the vibration level generated when the injector 90 closes in the overlapping range, and by comparing the integrated value of the knock signal KS in the non-overlapping range with the first reference value. The ECU 400 may determine that knocking has occurred when at least one of the integrated value of the knock signal and the integrated value of the subtracted knock signal exceeds the first reference value.

According to yet another exemplary embodiment of the present invention, the ECU 400 may determine whether knocking occurs by applying a filter constant, for example, a time constant to the integrated value of the knock signal KS only in the overlapping range, and then by comparing the filtered value with the first reference value. That is, to prevent a false detection of knocking, the ECU 400 may apply the filter constant to the integrated value of the knock signal KS only in the overlapping range.

Figure 3:
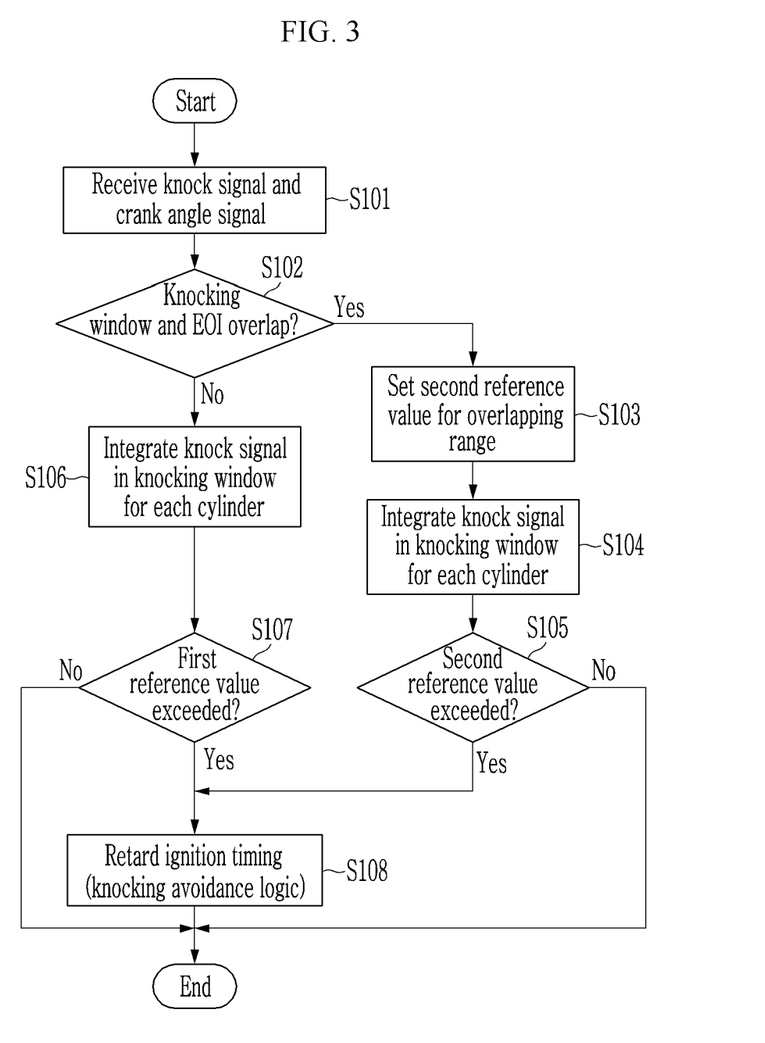
FIG. 3 is a flowchart showing a method for detecting knocking of an engine for a vehicle according to various exemplary embodiments of the present invention.

FIG. 3 is a flowchart showing a method for detecting knocking of an engine for a vehicle according to various exemplary embodiments of the present invention.

With reference to FIG. 1 to FIG. 3, apparatus and method for detecting knocking according to various exemplary embodiments of the present invention is hereinafter described in detail.

Firstly at step S101, the ECU 400 receives the knock signal KS indicating the vibration level in the cylinder 60 and the crank angle signal CAS indicating the rotation angle of the crankshaft 70.

Subsequently at step S102, the ECU 400 determines whether the knocking window and the end of injection (EOI) of the injector 90 overlap, based on the crank angle signal CAS.

The knocking window having a high frequency of knocking occurrence and the end of injection (EOI) of the injector 90 may be indicated in the rotation angle of the crankshaft 70. According to various exemplary embodiments of the present invention, the ECU 400 may determine the knocking window and the end of injection (EOI) of the injector 90 for respective cylinders 60 based on a plurality of crank angle signals CAS, and may determine whether they overlap.

When the knocking window and the end of injection (EOI) of the injector 90 overlap (S102—Yes), the ECU 400 sets the second reference value at step S103, by reflecting an effect of the injector closing vibration on the first reference value for determining whether knocking occurs.

The first reference value may be set based on the level of the normal vibration in which the condition of the engine 100, such as engine speed (RPM), air amount, and load, is reflected. The second reference value is set based on the level of the normal vibration and the injector closing vibration, and may be a value greater than the first reference value. According to various exemplary embodiments of the present invention, the ECU 400 may set the second reference value based on a specific numeral value for the injector closing vibration. At the instant time, the specific numeral value for the injector closing vibration may be obtained experimentally or statistically.

Subsequently at step S104, the ECU 400 integrates the knock signal KS with respect to the knocking window, and then at step S105, determines whether the integrated value exceeds the second reference value.

When the knocking window and the end of injection (EOI) of the injector 90 do not overlap (S102—No), the ECU 400 integrates, at step S106, the knock signal KS with respect to the knocking window, and then at step S107, determines whether the integrated value exceeds the first reference value.

At the step S104 and/or the step S106, the ECU 400 may separately integrate the knock signal KS with respect to the knocking window for each cylinder in a plurality of cylinders 60. According to various exemplary embodiments of the present invention, among the plurality of cylinders 60, the integrated value of the knock signal KS for a cylinder 60 of which the knocking window and the end of injection (EOI) of the injector 90 overlap may be compared with the first reference value by the ECU 400, and the integrated value of the knock signal KS for a cylinder 60 of which they overlap may be compared with the second reference value by the ECU 400.

Subsequently, when the integrated value exceeds the first reference value or the second reference value (S105—Yes or S107—Yes), the ECU 400 determines that knocking has occurred at the corresponding cylinder 60, and may perform the knocking avoidance logic, at step S108.

The ECU 400 may perform the knocking avoidance logic to retard the ignition timing with respect to the cylinder 60 for which the integrated value exceeds the first reference value or the second reference value among the plurality of cylinders 60. The ECU 400 may not perform the knocking avoidance logic with respect to the cylinder 60 for which the integrated value does not exceed the first reference value or the second reference value.

Figure 4:
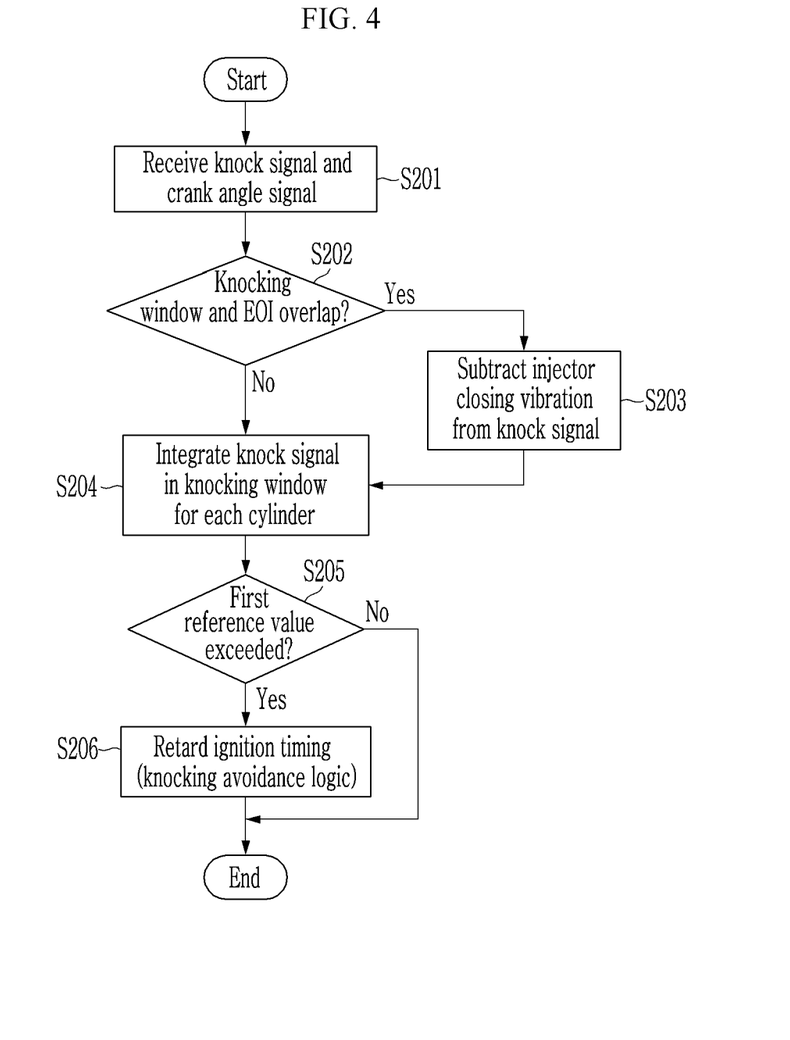
FIG. 4 is a flowchart showing a method for detecting knocking of an engine for a vehicle according to another exemplary embodiment of the present invention.

FIG. 4 is a flowchart showing a method for detecting knocking of an engine for a vehicle according to another exemplary embodiment of the present invention.

Apparatus and method for detecting knocking according to another exemplary embodiment of the present invention is described in detail with reference to FIG. 1, FIG. 2, and FIG. 4.

Firstly at step S201, the ECU 400 receives the knock signal KS indicating the vibration level in the cylinder 60 and the crank angle signal CAS indicating the rotation angle of the crankshaft 70. At the instant time, the ECU 400 may distinguish a plurality of vibrations that caused the vibration of the cylinder 60 for each frequency band based on the knock signal KS.

Subsequently at step S202, the ECU 400 determines whether the knocking window and the end of injection (EOI) of the injector 90 overlap, based on the crank angle signal CAS.

When the knocking window and the end of injection (EOI) of the injector 90 overlap (S202—Yes), the ECU 400 subtracts, at step S203, a value corresponding to the injector closing vibration from the knock signal KS. According to various exemplary embodiments of the present invention, the specific numeral value for the injector closing vibration may be obtained experimentally.

Subsequently at step S204, the ECU 400 integrates the knock signal KS subtracted with the injector closing vibration with respect to the knocking window, and then at step S205, determines whether the integrated value exceeds the first reference value.

When the knocking window and the end of injection (EOI) of the injector 90 do not overlap (S202—No), the ECU 400 integrates the knock signal KS as transmitted from the knock sensor 200, and determines whether the integrated value exceeds the first reference value.

At the step S204, the ECU 400 may separately integrate the knock signal KS with respect to the knocking window for each cylinder in a plurality of cylinders 60. With respect to the cylinder 60 among the plurality of cylinders 60 for which the knocking window and the end of injection (EOI) of the injector 90 are determined not to overlap, the ECU 400 simply integrates the knock signal KS. According to various exemplary embodiments of the present invention, with respect to the cylinder 60 among the plurality of cylinders 60 for which the knocking window and the end of injection (EOI) of the injector 90 are determined to overlap, the ECU 400 may subtract a value corresponding to the injector closing vibration from the knock signal KS, and then integrate the subtracted knock signal.

Subsequently, when the integrated value exceeds the first reference value (S205—Yes), the ECU 400 performs the knocking avoidance logic at step S206.

The ECU 400 may perform the knocking avoidance logic to retard the ignition timing with respect to the cylinder 60 among the plurality of cylinders 60 for which the integrated value exceeds the first reference value. The ECU 400 may not perform the knocking avoidance logic with respect to the cylinder 60 for which the integrated value does not exceed the first reference value.

Figure 5:
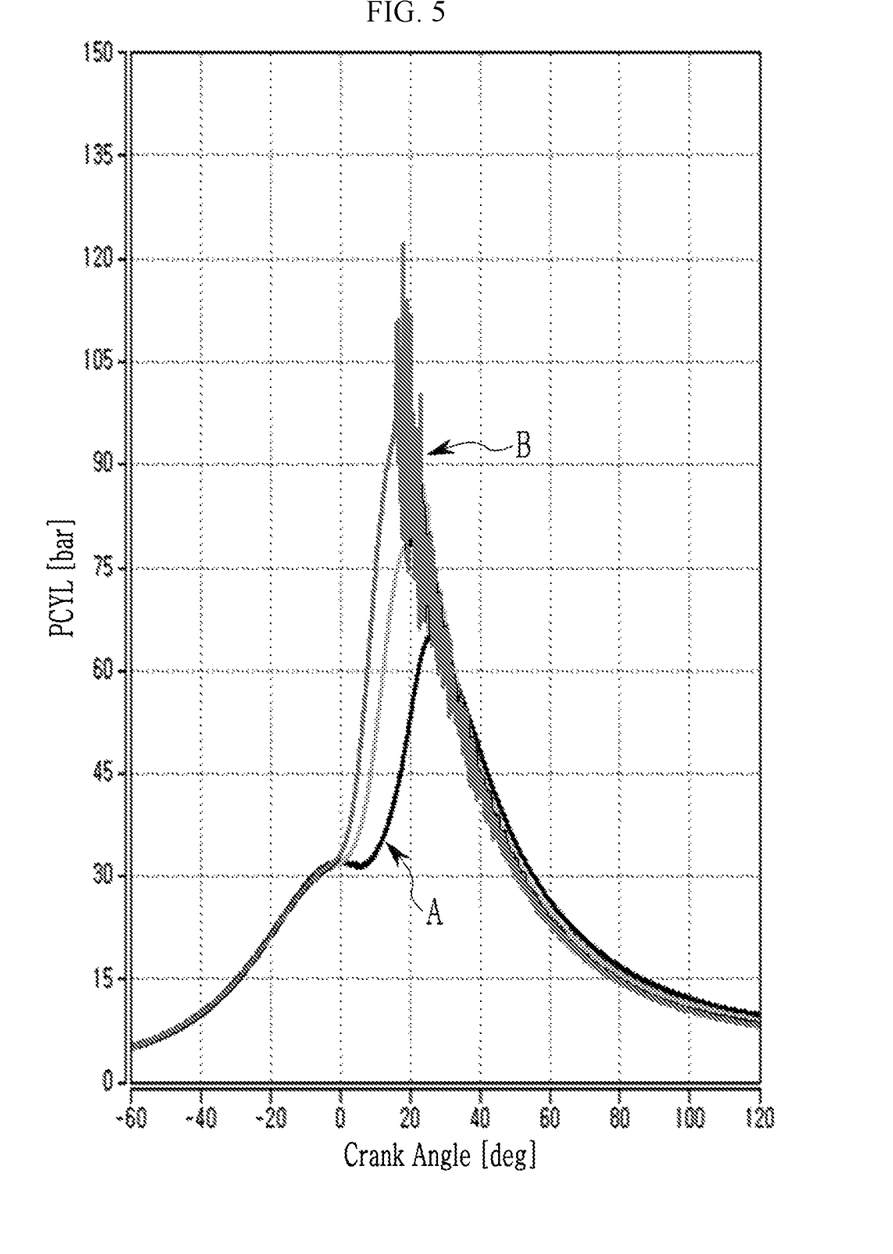
FIG. 5 illustrates exemplary pressure change in a cylinder of the engine with an occurrence of knocking according to various exemplary embodiments of the present invention.

FIG. 5 illustrates exemplary pressure change in a cylinder of the engine with an occurrence of knocking according to various exemplary embodiments of the present invention.

A first graph A shows a pressure change in the cylinder 60 during the compression stroke when knocking occurs, and a second graph B shows a pressure change in the cylinder 60 during the expansion stroke when knocking occurs. Referring to second graph B, when knocking occurs, a pressure in the cylinder 60 abruptly increases to a very high value and rapidly oscillates for a short period. For example, the ECU 400 may determine that knocking has occurred at about the rotation angle 20° of the crankshaft 70 where the second graph B exceeds the first reference value (e.g., 105 bar).

Referring to second graph B, according to various exemplary embodiments of the present invention, when the knocking window and the end of injection (EOI) of the injector 90 are determined to overlap, the ECU 400 may set the second reference value (e.g., 130 bar) by reflecting an effect of the injector closing vibration on the first reference value (e.g., 105 bar). The ECU 400 may determine that knocking has not occurred, based on the integrated value of the knock signal KS with respect to the knocking window, for example, a rotation angle range of 10° to 30° of the crankshaft 70, being smaller than or equal to the second reference value According to another exemplary embodiment of the present invention, when the knocking window and the end of injection (EOI) of the injector 90 are determined to overlap, the ECU 400 subtracts a value corresponding to the injector closing vibration from the knock signal KS, and then compares the integrated value with the first reference value. For example, the ECU 400 may determine that knocking has not occurred on the ground that an integrated value of a value obtained by subtracting a value corresponding to the injector closing vibration from the knock signal KS does not exceed 1 the first reference value.

According to yet another exemplary embodiment of the present invention, when the knocking window and the end of injection (EOI) of the injector 90 are determined to overlap, the ECU 400 may apply the filter constant (time constant), only in an overlapping range, to the integrated value of the knock signal KS with respect to the exemplary a rotation angle range of 10° to 30° of the crankshaft 70, and compare the value with the first reference value. For example, the ECU 400 may determine that knocking has not occurred on the ground that the integrated value does not exceed the first reference value, with respect to a range applied with the filter constant (time constant) and the remaining range.

Furthermore, the term "controller" or "control unit" refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The controller according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors.

The controller or the control unit may be at least one microprocessor operated by a predetermined program which may include a series of commands for carrying out a method in accordance with various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A method of detecting knocking of an engine for a vehicle, the method comprising:
   receiving, by a controller, a knock signal indicating a vibration level in a cylinder of the engine and a crank angle signal indicating a crank angle by which a knocking window and an end of injection of an injector in the engine are expressed;
   determining, by the controller, whether the knocking window and the end of injection of the injector overlap, according to the crank angle signal;
   setting, by the controller, a second reference value for an overlapping range within the knocking window overlapping the end of injection of the injector by reflecting according to a predetermined level on a first reference value for a non-overlapping range within the knocking window non-overlapping the end of injection of the injector, depending on whether the knocking window and the end of injection of the injector overlap;
   integrating, by the controller, the knock signal in the knocking window;
   determining, by the controller, whether an integrated value of the knock signal is greater than the first reference value in the non-overlapping range or the second reference value in the overlapping range; and
   retarding, by the controller, an ignition timing of the engine as a knocking avoidance logic depending on whether the integrated value of the knock signal is greater than the first reference value in the non-overlapping range or the second reference value in the overlapping range.

2. The method of claim 1, wherein when the controller concludes that the knocking window and the end of injection of the injector overlap, the controller is configured to set the second reference value.

3. The method of claim 2, wherein the controller is configured to integrate the knock signal with respect to the knocking window, and then determines whether the integrated value exceeds the second reference value.

4. The method of claim 3, wherein when the integrated value exceeds the second reference value, the controller is configured to conclude that the knocking has occurred at the cylinder and to retard the ignition timing of the engine as the knocking avoidance logic.

5. The method of claim 1, wherein when the knocking window and the end of injection of the injector do not overlap, the controller is configured to integrate the knock signal with respect to the knocking window, and then to determine whether the integrated value exceeds the first reference value.

6. The method of claim 5, wherein when the integrated value exceeds the first reference value, the controller is configured to conclude that the knocking has occurred at the cylinder and to retard the ignition timing of the engine as the knocking avoidance logic.

7. The method of claim 1, wherein the controller includes:
   a processor; and
   a non-transitory storage medium on which a program for performing the method of claim 1 is recorded and executed by the processor.

8. The method of claim 1, wherein the controller is configured to receive the crank angle signal from a crank angle sensor configured for detecting a rotation angle of a crankshaft in the engine, and the knock signal from a knock sensor configured for detecting vibration in the cylinder.

9. A method of detecting knocking of an engine for a vehicle, the method comprising:
   receiving, by a controller, a knock signal indicating a vibration level in a cylinder of the engine and a crank angle signal indicating a crank angle by which a knocking window and an end of injection of an injector in the engine are expressed;
   determining, by the controller, whether the knocking window and the end of injection of the injector overlap, according to the crank angle signal;
   subtracting, by the controller, a value corresponding to the vibration level generated from knock signal when the injector closes in an overlapping range within the knocking window overlapping with the end of injection of the injector from the knock signal, depending on whether the knocking window and the end of injection of the injector overlap;
   integrating, by the controller, the knock signal in a non-overlapping range within the knocking window non-overlapping the end of injection of the injector and integrating the subtracted knock signal in the overlapping range;
   determining, by the controller, whether the knock signal or the subtracted integrated value of the knock signal is greater than a reference value; and
   retarding, by the controller, an ignition timing of the engine as a knocking avoidance logic depending on whether the knock signal or the subtracted integrated value of the knock signal is greater than the reference value.

10. The method of claim 9, wherein the controller receives the crank angle signal from a crank angle sensor configured for detecting a rotation angle of a crankshaft in the engine, and the knock signal from a knock sensor configured for detecting vibration in the cylinder.

11. The method of claim 9, wherein when the controller concludes that the knocking window and the end of injection of the injector overlap, the controller is configured to subtract the value corresponding to the vibration level from the knock signal.

12. The method of claim 9, wherein the controller is configured to integrate the knock signal subtracted with the vibration level with respect to the knocking window.

13. The method of claim 9, wherein when the knocking window and the end of injection of the injector do not overlap, the controller is configured to integrate the knock signal as transmitted from a knock sensor.

14. The method of claim 9, wherein the controller includes:
- a processor; and
- a non-transitory storage medium on which a program for performing the method of claim 9 is recorded and executed by the processor.

\* \* \* \* \*